United States Patent
Mitchell

(10) Patent No.: US 7,280,498 B1
(45) Date of Patent: Oct. 9, 2007

(54) LOW-LATENCY/LOW LINK MARGIN AIRBORNE SATELLITE INTERNET SYSTEM AND METHOD USING COTS INFRASTRUCTURE

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 665 days.

(21) Appl. No.: 10/894,139

(22) Filed: Jul. 19, 2004

(51) Int. Cl.
*H04B 7/185* (2006.01)
*H04B 7/14* (2006.01)

(52) U.S. Cl. ............. 370/316; 370/338; 455/12.1; 455/13.1; 455/13.2; 455/13.22; 709/223; 709/227

(58) Field of Classification Search ........ 370/316, 370/338; 455/12.1, 13.1, 13.2; 709/209, 709/223, 226, 227
See application file for complete search history.

(56) References Cited

U.S. PATENT DOCUMENTS

| | | | |
|---|---|---|---|
| 5,950,129 A | * | 9/1999 | Schmid et al. ............ 455/431 |
| 6,529,706 B1 | | 3/2003 | Mitchell |
| 6,741,841 B1 | * | 5/2004 | Mitchell ................. 455/188.1 |
| 7,058,401 B1 | * | 6/2006 | Sinivaara et al. ........... 455/431 |
| 2002/0098800 A1 | * | 7/2002 | Frazita et al. .............. 455/12.1 |
| 2005/0053026 A1 | * | 3/2005 | Mullan et al. .............. 370/316 |

* cited by examiner

*Primary Examiner*—William Trost
*Assistant Examiner*—Julio Perez
(74) *Attorney, Agent, or Firm*—Nathan O. Jensen; Kyle Eppele

(57) ABSTRACT

Low-latency satellite Internet service from a commercial off-the-shelf two-way satellite Internet system for aircraft under marginal communications link conditions is provided. One or more identical Internet requests each having a unique ID are sent in rapid succession from the aircraft. The one or more identical Internet requests are received at a satellite and sent to a network operations center (NOC) where they are forwarded over the Internet to an appropriate Web site. Identical Web pages are retrieved for the identical Internet requests by the NOC and transmitted to the satellite and then relayed to the aircraft. The requested Web page data is fused for the requested Web pages into a single Web page response in accordance with the unique IDs in the server for viewing by a client PC with low-latency when a failure in transmitting and receiving identical Internet requests and requested Web pages occurs.

20 Claims, 6 Drawing Sheets

LOW-LATENCY/LOW LINK MARGIN AIRBORNE SATELLITE INTERNET SYSTEM AND METHOD USING COTS INFRASTRUCTURE

BACKGROUND OF THE INVENTION

The present invention relates to airborne Internet and specifically to a low-latency/low link margin airborne satellite Internet system using commercial off-the-shelf infrastructure (COTS).

The present application is related to U.S. Pat. No. 6,529,706 "Aircraft satellite communications system for distributing Internet service from direct broadcast satellites" by James P. Mitchell, assigned to the assignee of the present application, and is incorporated by reference in its entirety.

Systems for delivering Internet service from direct broadcast satellites to ground-based users are commercially available such as Hughes DIRECPC and DIRECWAY and from STARBAND Communications Inc. A future satellite service, Hughes SPACEWAY, is planned for delivery of Internet services. A direct broadcast satellite Internet system 100 is shown in FIG. 1. In a DIRECPC or similar system a client PC (personal computer) 110 requests a URL using a IP (Internet protocol) protocol over a telephone system 120 with a modem. The URL request has a tunneling code, address, or similar identifier attached to it before it is sent to an Internet service provider (ISP) 125. The code tells the ISP 125 to forward the URL request over the Internet 130 to a network operations center (NOC) 140. The ISP 125 may be collocated with the network operations center 140. In usual Internet operations the URL request is sent to a requested Web site 135 instead of the network operations center 140. The network operations center 140 receives the URL request, removes the tunneling code, and then forwards the request over the Internet 130 to the appropriate Web site 135. The requested Web pages are then retrieved and sent to the network operations center 140. At the network operations center 140 the Web page data is uplinked to a direct broadcast satellite 150. From the DBS satellite 150 the data is then transmitted to a small vehicle-mounted dish 115 and DBS receiver 117 at the client PC 110. A split communications system such as this has the advantage of speeding up Internet data delivery over the rates available over conventional telephone lines. This is due to the low-band width URL request from the client PC 110 delivered over the conventional telephone system 120 at slow rates and high-bandwidth large Web pages being delivered over a high data rate satellite link.

Systems such as DIRECWAY and STARBAND are two-way systems that transmit a request from the PC 110 to the receiver 117, that also includes a transmitter, directly to the satellite 150. The satellite 150 relays the request to the NOC 140 that may also contain a hub ISP. The requested Web pages are then retrieved and set to the NOC 140 for transmission over the satellite 150 as before.

Global Internet coverage and access to an aircraft has been accomplished in some regions of the world using the two-way systems described but continues to face difficult technical problems in others. Variables such as antenna gain, satellite EIRP, receiver design, forward error correction choices, antenna pointing, antenna beamwidth, aircraft dynamics, etc. require very specialized designs and system approaches to make global Internet coverage work.

TCP/IP over two-way satellite communications links can build up very long latencies especially if the link is encountering high bit error rate problems. Aircraft dynamics also introduce moments of satellite blindness in marginal RF coverage regions such as extreme latitudes. Typically if non-repairable data errors occur, the protocol initiates additional automatic repeat requests (ARQs). If the errors continue, the request is repeated again and after several tries several undesired seconds of geostationary satellite round-trip delays have occurred. Geostationary satellite links have more than a 500-ms round trip time.

While custom hybrid protocol methods including specialized FEC (forward error correction, UDP (user datagram protocol) and others can be used to assist this problem, custom solutions are costly and likely involve interventions with NOC 140 design and operation, the aircraft communications infrastructure and the client application.

TCP protocol acknowledgement spoofing methods are sometimes used by industry to reduce the effective latency of a reliable satellite link however these methods require a cooperative NOC and custom hardware at both end of the link resulting in a non-COTS system. These methods do nothing significant to combat poor link margin conditions.

Custom designed system elements, data services, and satellite protocol spoofing methods are vastly more costly than similar ground COTS only systems and services. For example the popular COTS direct-to-home two-way Ku-band services such as DIRECWAY and STARBAND described above cost about $2 a day in comparison to connectivity services for airborne applications that can run orders of magnitude higher at just the broadband connectivity service level alone.

Therefore a need exists for better leverage of existing commercial satellite infrastructure for improved cost and improved services.

SUMMARY OF THE INVENTION

A low-latency aircraft satellite Internet system is disclosed that uses a commercial off-the-shelf two-way satellite Internet service. In the low-latency aircraft satellite Internet system a client PC on board an aircraft originates a client Internet request. A server on board the aircraft generates from the client Internet request more than one identical Internet requests each having a unique ID. A satellite transceiver on board the aircraft transmits the more than one identical Internet requests in rapid succession. A satellite receives one or more surviving identical Internet requests from the satellite transceiver on board the aircraft and sends the one or more surviving identical Internet requests in rapid succession.

A network operations center (NOC) receives the one or more surviving identical Internet request from the satellite, forwards each of the one or more surviving identical requests over the Internet to an appropriate Web site, retrieves requested Web page data for each of the one or more surviving identical requests, and transmits the requested Web page data for each of the one or more surviving Internet requests to the satellite.

The satellite relays a surviving requested Web page data for each surviving identical Internet request to the satellite transceiver for forwarding to the server. The server receives the surviving requested Web page data for each surviving identical Internet request and fuses surviving received Web page data for the surviving requested Web pages into a single low-latency Web page response in accordance with the unique IDs for viewing by the client PC.

In the low-latency aircraft satellite Internet system the number of identical Internet requests is determined by communications link quality. An upper limit on the number of identical requests is determined by system bandwidth.

When the server on board the aircraft receives few surviving requested Web pages for the surviving identical Internet requests, the server increases a number of identical Internet requests. When the server on board the aircraft receives most surviving requested Web pages for the surviving identical Internet requests, the server decreases the number of identical Internet requests.

It is an object of the present invention to utilize commercial off-the-shelf two-way satellite Internet products in areas with low communications link margin.

It is an object of the present invention to use COTS two-way Internet satellite services to reduce system latency.

It is an advantage of the present invention to employ a unique parallel protocol (TCP/IP) method.

It is an advantage of the present invention to use a network operations center with no modifications.

It is a feature of the present invention to provide low-latency Internet service to a client browser on board an aircraft using at least one surviving return from multiple identical requests.

It is a feature of the present invention to only require modification to server software to fuse multiple responses and dynamically initiate the number of requests based on link performance and trends.

It is a feature of the present invention to provide an airborne Internet system that launches multiple requests and assembles returned fragments as one reply.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for a low-latency aircraft satellite Internet system that uses commercial off-the-shelf (COTS) services such as DIRECPC, DIRECWAY, or STARBAND two-way satellite Internet services. While intended for aircraft use, the present invention may be used on other vehicles such as ships, automobiles, trains, etc.

The present invention is for a method of reusing/integrating the COTS equipment and satellite Internet services with a scheme to improve data recovery in marginal link regions. Because TCP offers an automatic try/retry protocol when accessing data, it would appear that a brute force retry method may be of some value as a solution to marginal link problems. However the latency of a round trip through the satellite system can take well over 500 ms for each try building up latency quickly. The present invention offers a unique solution to these problems and reduces the latency by operating a parallel request protocol approach. The approach is uniquely transparent to a commercial NOC and Internet equipment supplier.

Figure 1:
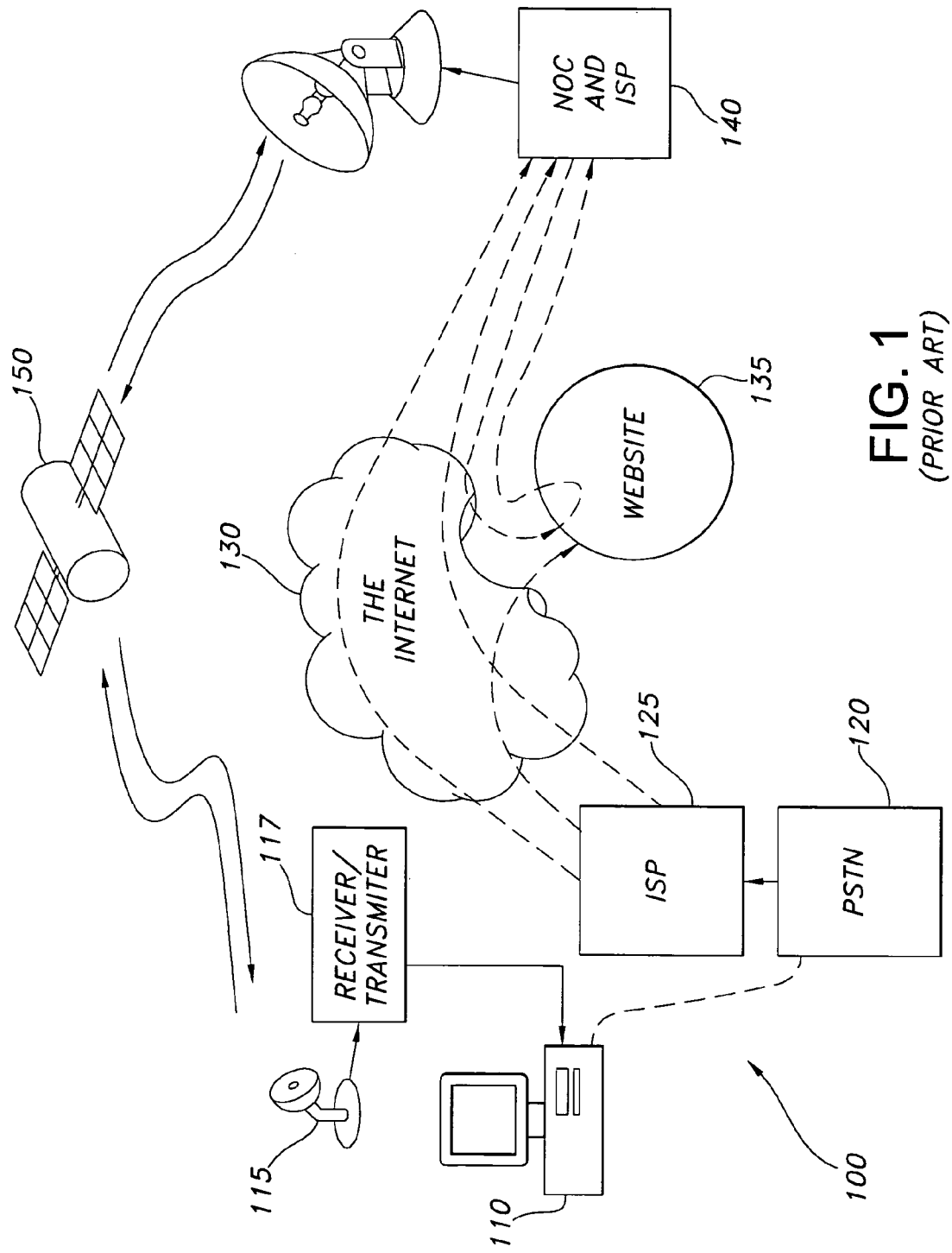
FIG. 1 is a block diagram of a prior art direct broadcast satellite Internet system with independent request/reply methods.
Figure 2:
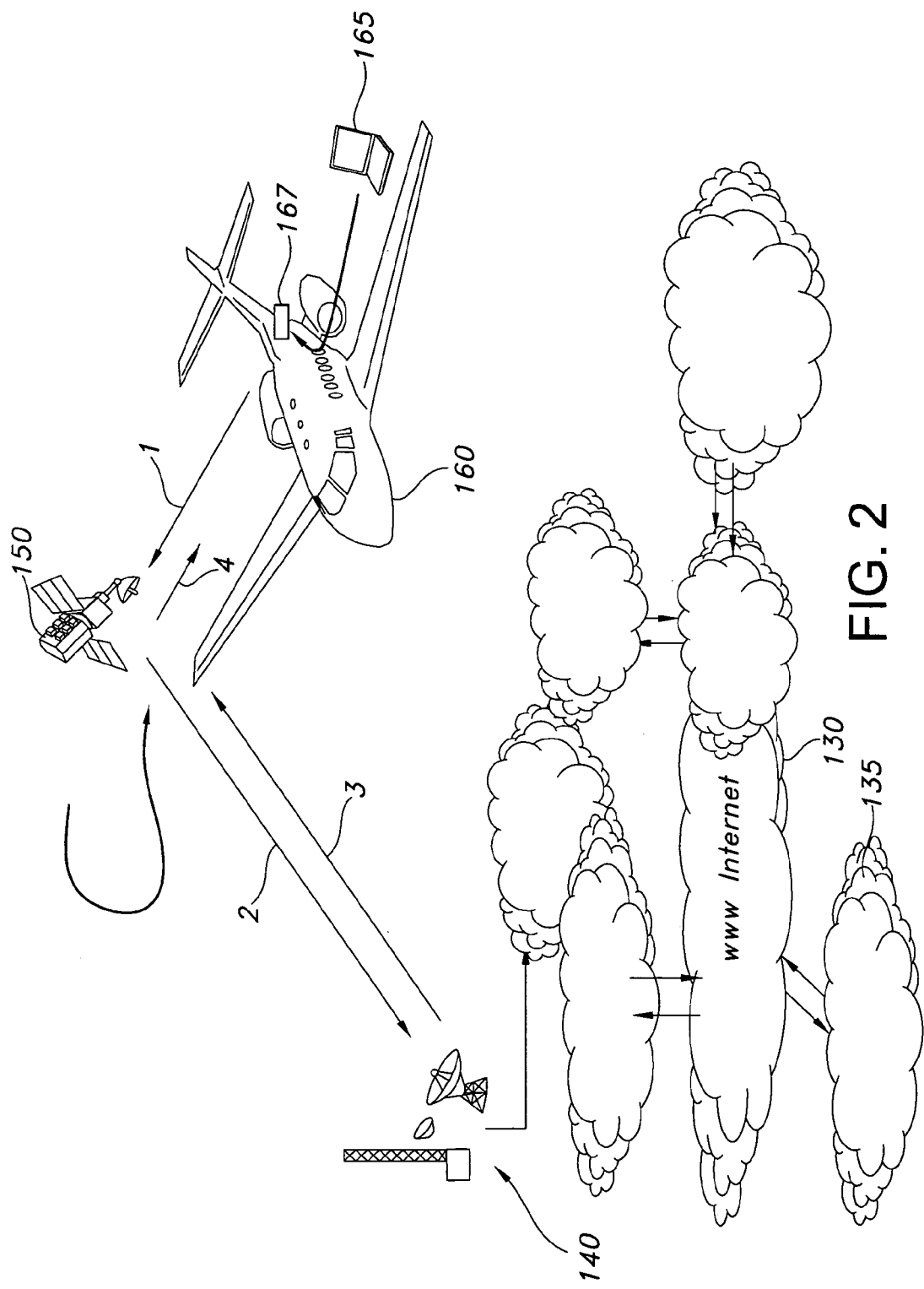
FIG. 2 shows implementation of an aircraft satellite Internet system using such commercial off-the-shelf services as DIRECWAY or STARBAND or future services such as SPACEWAY.

FIG. 2 shows implementation of an aircraft satellite Internet system using such COTS services as DIRECWAY or STARBAND. In FIG. 2 a client browsing the Internet 130 using a laptop computer 165 initiates a URL Internet request onboard an aircraft 160. The URL Internet request is transmitted with satellite transceiver 167 onboard the aircraft 160 to the satellite 150 as indicated by arrow 1. The satellite 150 transmits the URL request to the NOC 140 as indicated by arrow 2. The network operations center 140 receives the URL request and then forwards the request over the Internet 130 to the appropriate Web site 135 as described in conjunction with FIG. 1. The requested Web pages are then retrieved and sent to the NOC 140. At the network operations center 140 the Web page data is transmitted to the satellite 150 as shown by arrow 3. From the satellite 150 the Web page data is then transmitted to the aircraft 160 as shown by arrow 4 and to transceiver 167 and finally to the client PC 165. In this scenario only one request is originated from the client PC 165, sent to satellite 150, and relayed to NOC 140. Only one reply is sent from NOC 140 to the satellite 150 and relayed to the aircraft 160 in response to the request. Arrow 4 is shortened to indicate a failure in the transmission from satellite 150 to aircraft 160. With the failure due to marginal satellite RF coverage or within equipment, a retry is initiated. With the round trip for the request and reply time of approximately 500 ms latency builds up with each retry adding 500 ms.

Figure 3:
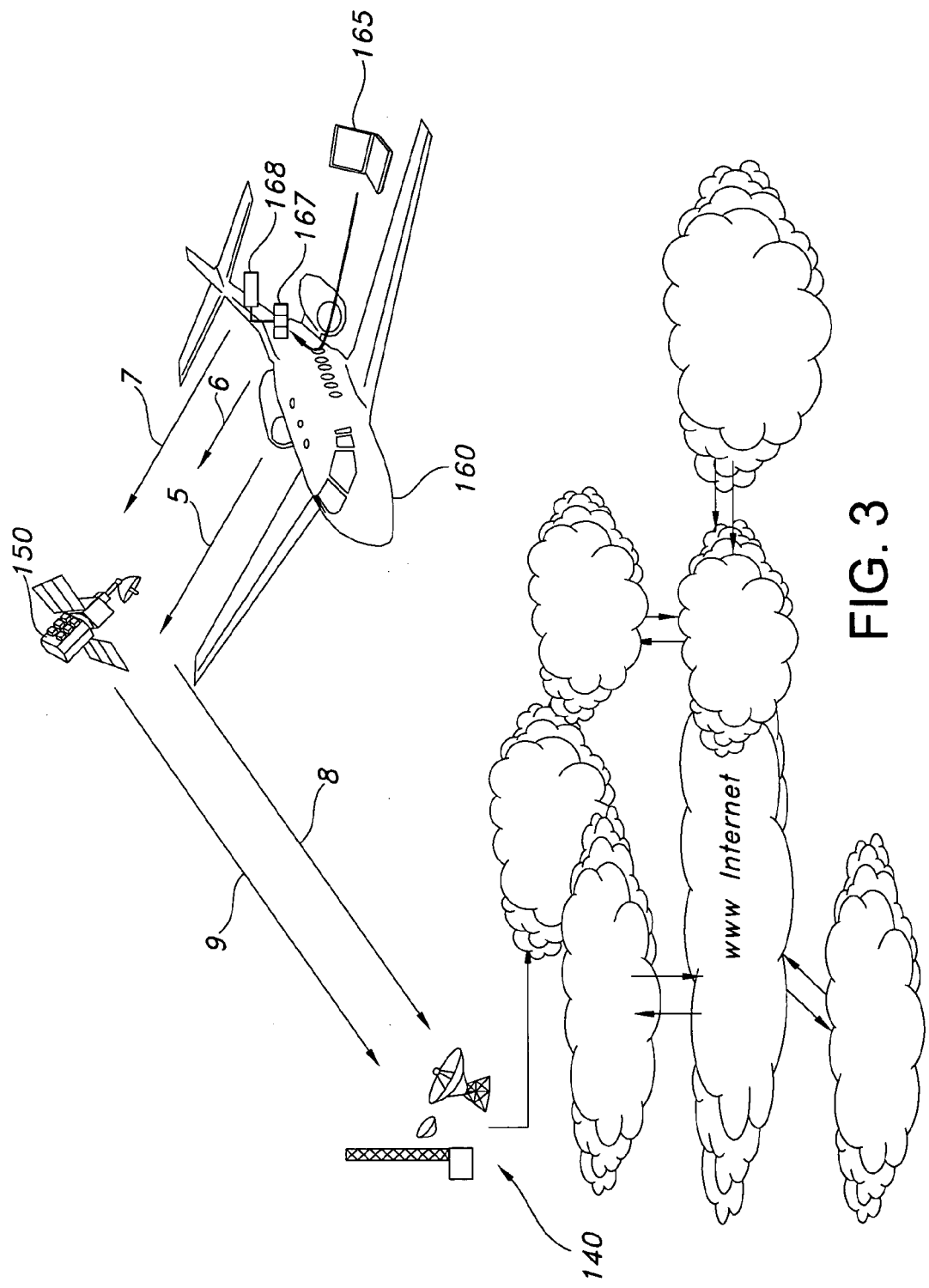
FIG. 3 illustrates operation of the present invention in the system shown in FIG. 2 when a number of identical Internet requests are made with loss of one request.

The operation of the present invention is described in conjunction with FIG. 3. In FIG. 3 a request originating at the client PC 165 is sent to a server 168 that generates a number of identical requests and sends each temporally after the other (within microseconds) through the COTS satellite transceiver 167 to the satellite 150 as indicated by arrows 5, 6, and 7. The number of requests generated by the server 168 is more than one with three shown in FIG. 3. The number of identical requests from the aircraft 160 is from the single user PC 165 under an alias of a plurality of different user IDs (identifications). The number of identical requests is dynamically adjusted in real time to match link performance statistics. Poorer links yield a higher number of identical requests under different IDs for a single user.

In FIG. 3 arrow 6 is shown shorted to indicate that the request 6 failed to reach the satellite 150 due to such factors as poor link margin. Satellite 150 receives surviving identical Internet request 5 and 7 and downlinks surviving requests 5 and 7 received from the aircraft 160 as arrows 8 and 9 to the NOC 140. The two surviving requests 8 and 9 from the satellite 150 are delivered nearly simultaneously to the NOC 140. The total aircraft 160 to NOC 140 transmission time is approximately 250 ms for the set of multiple requests.

Figure 4:
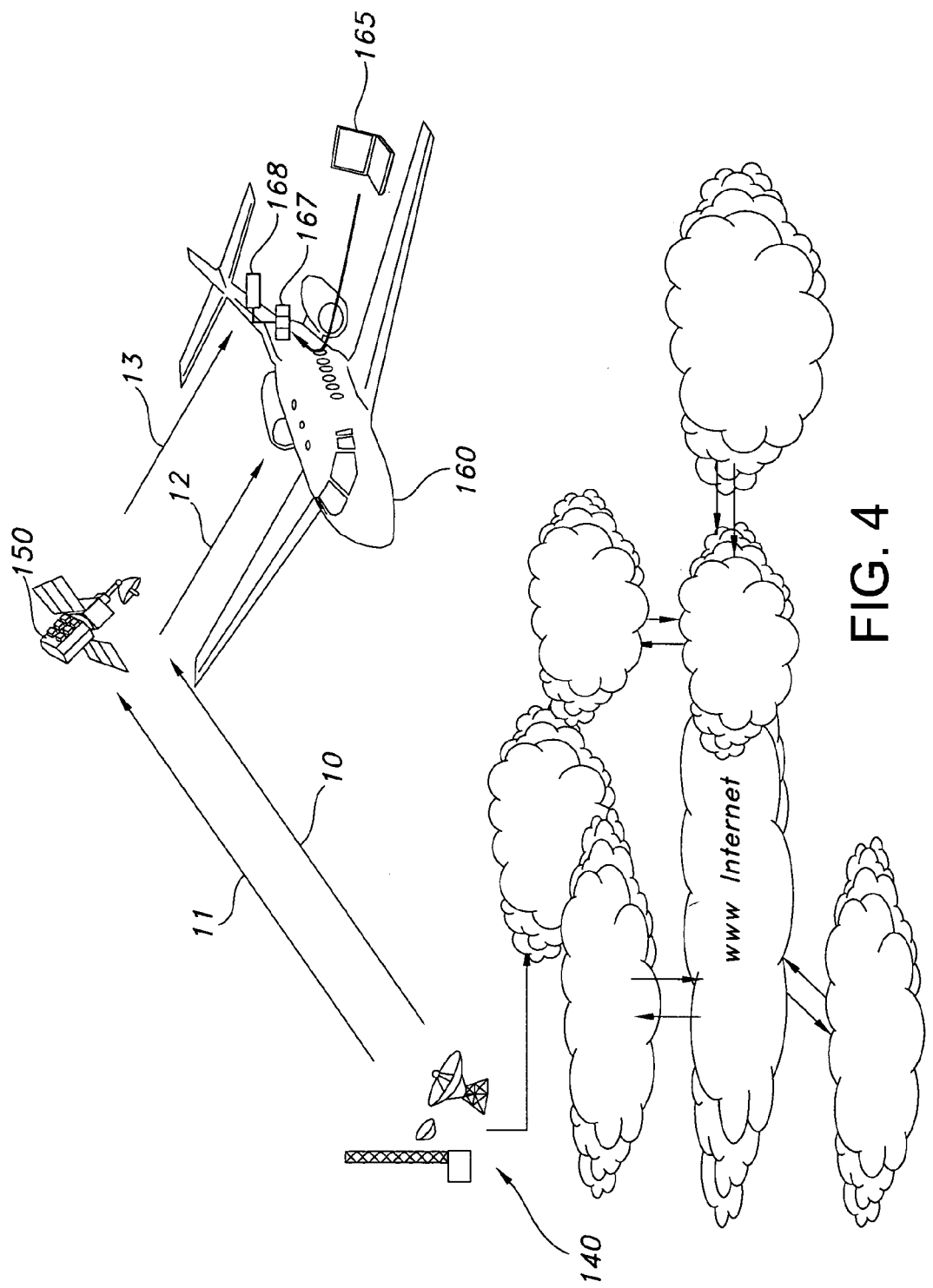
FIG. 4 illustrates operation of the present invention in the system of FIG. 2 when a response to the number of identical Internet requests of FIG. 3 is made.

The unmodified NOC 140 recognizes each request as separate but identical due to the unique ID for each request, seeks or requests data from the Internet and returns individual requested Web page data for each surviving request 8 an 9 back to the aircraft 160 through the satellite 150. In FIG. 4 a Web page data response from the NOC 140 to the surviving requests 8 and 9 in FIG. 3 is sent to the satellite 150 nearly simultaneously as indicated by arrows 10 and 11. Each Web page data response contains the unique ID. The satellite 150 relays the Web page data responses to the aircraft 160 as indicated by arrows 12 and 13. The responses are processed by the satellite transceiver 167 and server 168. The two surviving Web page data file fragments delivered as indicated by arrows 12 and 13 are fused in server 168 and sent to PC 165. The total NOC 140 to aircraft 160 transmission time is approximately 250 ms for the set of multiple requests. As a result the client PC 165 views low-latency Internet content with the loss of one of the number of requests.

Figure 5:
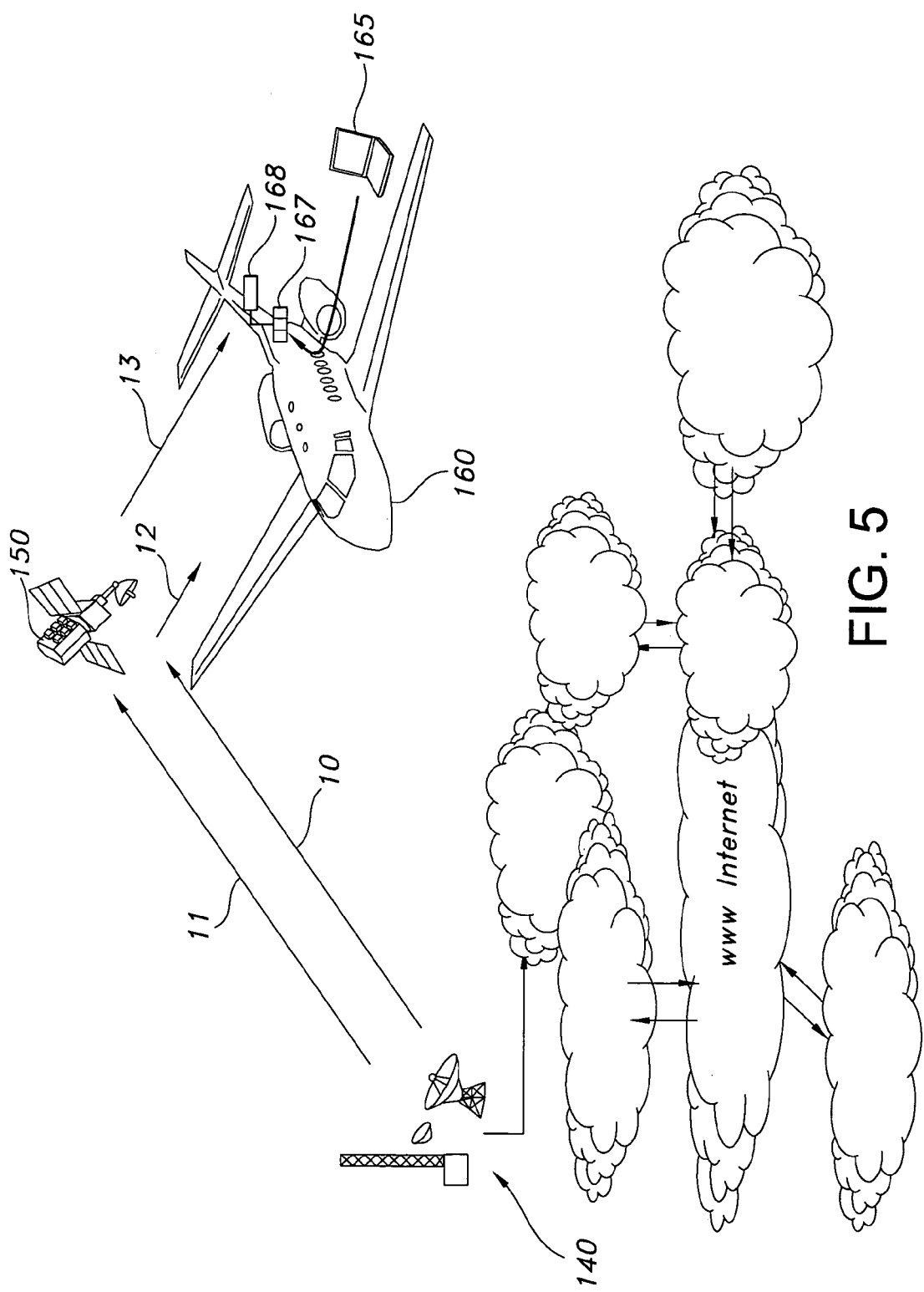
FIG. 5 illustrates operation of the present invention in the system of FIG. 2 when a response to the number of identical Internet request of FIG. 3 is made with a loss of one return.

FIG. 5 shows an alternate scenario for FIG. 4 where the replies indicated by arrows 10 and 11 reach the satellite 150 but reply 12 from the satellite 150 to the aircraft 160 is lost during RF conversion in the aircraft transceiver 167 for example. The single surviving reply 13 is received by the transceiver 167 and forwarded by the server 168 to the PC 165 for low-latency Internet content viewing.

Figure 6:
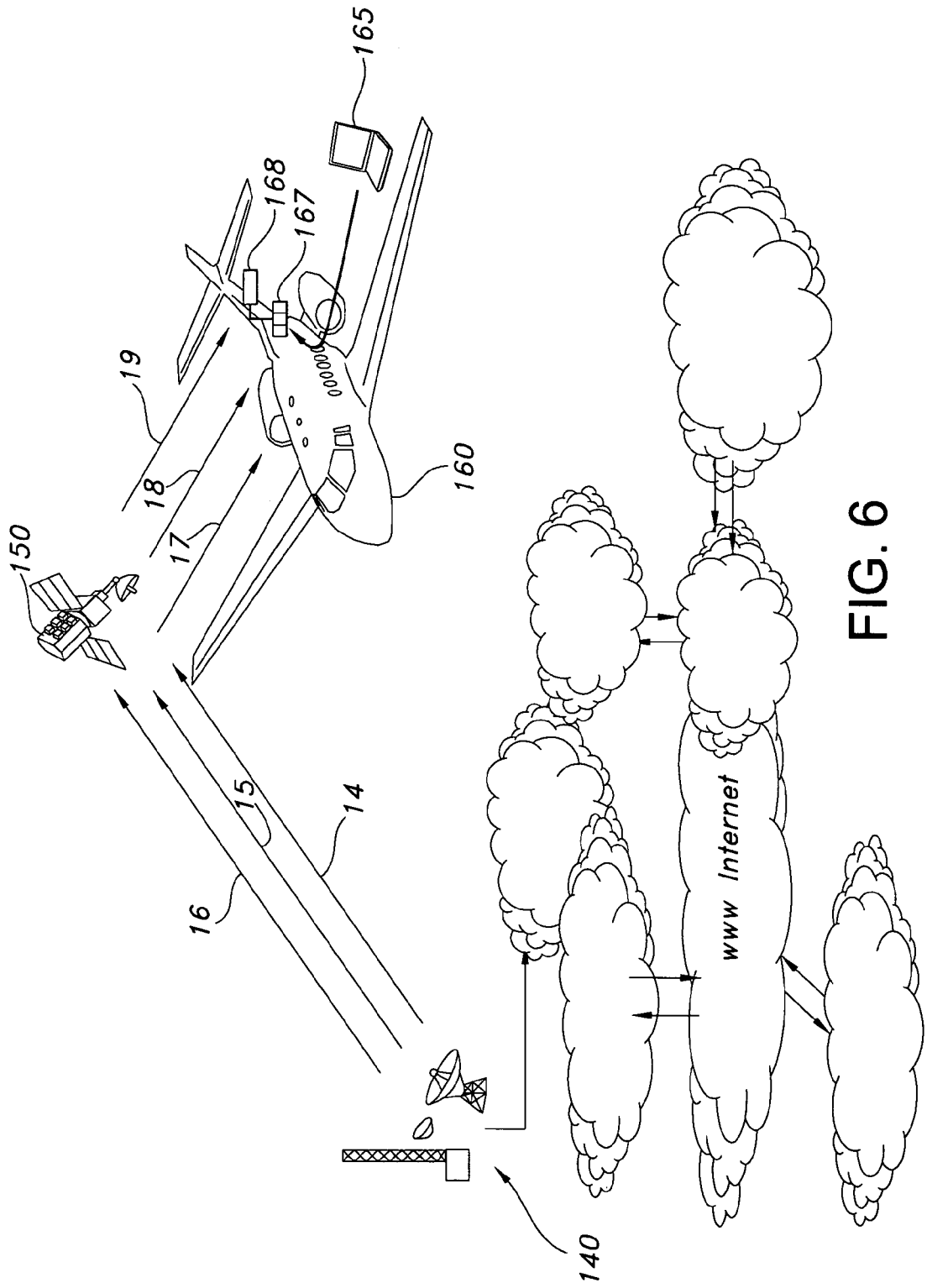
FIG. 6 illustrates operation of the present invention in the system of FIG. 2 when a response to the number of identical Internet requests of FIG. 3 is made with no loss of request or response.

In FIG. 6 all three requests from the aircraft 160 as indicated by arrows 5, 6, and 7 in FIG. 3 are assumed to make it to the NOC 140 through the satellite 150. NOC 140 transmits with three identical content Web page data replies near simultaneously as indicated by arrows 14, 15, and 16. The satellite 150 receives the Web page data replies 14, 15, and 16 and sends them to aircraft 160 as indicated by arrows 17, 18, and 19. All three Web page data replies survive and are received by the transceiver 167 on board the aircraft 160 and fused in server 168 and then presented for viewing the low-latency Internet content on PC 165.

Web page data packets and files are delivered back to the aircraft 160, where the on-board server 168 software fuses the surviving packet, files and file fragments originating under the requests with the unique IDs. A proxy is placed between the file assembly process and client's browser so that the browser only consumes satellite delivered data after it has gone through the fusion process. A cancel from the on-board server 168 may be executed any time it is determined a transfer is no longer productive for any given individual session or transfer such as when enough Web page data has been received to construct the Web page. Likewise a partial transfer may also be requested for any of the independent sessions.

As a part of this invention, the system and method also includes the regulation of the number of initial identical Internet requests based on satellite carrier strength, historical link quality, aircraft dynamics, etc. or anything useful in predicting future link quality. The ultimate number of initial identical Internet requests depends on the bandwidth expense for performance. A cap on the number of assigned request channels can be added as a feature.

The NOC 140 responds to the original number of identical Internet requests that are successfully heard. This method dynamically requires more bandwidth to be used, however only during poor measured performance. When the aircraft 160 server 168 is getting insufficient Web page data back, the server 168 sends more identical Internet requests to the ground NOC 140. If the aircraft server 168 is receiving sufficient Web page data to reconstruct the requested Web page, it then decreases the number of requests thereby conserving bandwidth. The number of requests may be decreased to one.

As an additional feature of the invention, the interval time between identical Internet requests from the aircraft 160 and the ground NOC 140 can be dynamically programmed to any interval in order to add temporal diversity to reducing issues due to poor link margin, antenna pointing and satellite coverage variables. For example the aircraft 160 may experience turbulence causing the aircraft 160 to laterally dip suddenly, causing an antenna system (not shown) to loose some of its desired beam directivity with the satellite 150. The physical dynamics of the antenna pointing system correct for this error quickly but in many cases there is still some undesirable pointing latency due to system mass and reaction time, making the link margin less than optimum at moments. Further, the antenna may be in a marginal coverage region where the satellite 150 does not always maintain enough link margin, or the system combination of the satellite beam and the aircraft antenna do not provide enough margin.

As a solution to this, an aircraft inertial navigation system (not shown) or part of the antenna system provides near instantaneous aircraft navigation data through aircraft data interface systems. The real-time aircraft navigation data may used to dynamically time, predict by trend, or hold-off data transmissions until the antenna improves its beam pointing error. This process improves transmission delivery and reduces air-to ground-air network congestion by eliminating transmissions that are likely to fail the link based on these factors.

The present invention initiates enough identical air-to-ground requests spoofing existing COTS hardware and software into believing it is serving multiple users, when in fact it is serving only one, and to be able to obtain enough good data packets in return from surviving replies to assemble at least one good complete response using only one air-to-ground-to-air satellite round trip period most of the time. The present invention is for a system and method that rides over existing COTS solutions to provide the unique ability to launch multiple requests and assemble the returned fragments as one reply.

It is believed that the low-latency/low link margin airborne satellite Internet system of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A low-latency aircraft satellite Internet system comprising:
   a client PC on board an aircraft for originating a client Internet request;
   a server on board the aircraft for generating from the client Internet request more than one identical Internet request each having a unique ID;
   a satellite transceiver on board the aircraft for transmitting the more than one identical Internet request in rapid succession;
   a satellite for receiving one or more surviving identical Internet requests from the satellite transceiver on board the aircraft and sending the one or more surviving identical Internet requests in rapid succession;
   a network operations center (NOC) for receiving the one or more surviving identical Internet request from the satellite, for forwarding each of the one or more surviving identical requests over the Internet to an appropriate Web site, retrieving requested Web page data for each of the one or more surviving identical Internet requests, and transmitting the requested Web page data for each of the one or more surviving Internet requests to the satellite;

wherein the satellite relays surviving requested Web page data for each of the one or more surviving identical Internet requests to the satellite transceiver for forwarding to the server; and wherein the server receives the surviving requested Web page data for each of the one or more surviving identical Internet requests and fuses the surviving received Web page data for the surviving one or more requested Web pages into a single low-latency Web page in accordance with the unique IDs for viewing by the client PC.

2. The low-latency aircraft satellite Internet system of claim 1 wherein the satellite Internet system comprises a commercial off-the-shelf two-way satellite Internet service.

3. The low-latency aircraft satellite Internet system of claim 1 wherein a number of identical Internet requests is determined by communications link quality.

4. The low-latency aircraft satellite Internet system of claim 3 wherein an upper limit on the number of identical requests is determined by available system bandwidth.

5. The low-latency aircraft satellite Internet system of claim 3 wherein when the server on board the aircraft receives insufficient surviving requested Web page data for the one or more surviving identical Internet requests said server increases the number of identical Internet requests.

6. The low-latency aircraft satellite Internet system of claim 3 wherein when the server on board the aircraft receives sufficient surviving requested Web page data for the one or more surviving identical Internet requests said server decreases the number of identical Internet requests.

7. The low-latency aircraft satellite Internet system of claim 1 wherein temporal diversity of the more than one identical Internet request is determined by communications link quality.

8. The low-latency aircraft satellite Internet system of claim 1 wherein temporal diversity of the more than one identical Internet request is determined by aircraft dynamics.

9. A method of providing low-latency aircraft satellite Internet service from a commercial off-the-shelf two-way satellite Internet system comprising the steps of:

originating an Internet request with a client PC on board an aircraft;

generating from the client PC Internet request more than one identical Internet request each having a unique ID and each sent in rapid succession from a server on board the aircraft;

transmitting the more than one identical Internet request each in rapid succession from a satellite transceiver on board the aircraft;

receiving the more than one identical Internet request from the satellite transceiver in a satellite;

sending the more than one identical Internet request in rapid succession from the satellite;

receiving the more than one identical Internet request from the satellite in a network operations center (NOC);

forwarding from the NOC the more than one identical Internet request over the Internet to an appropriate Web site;

retrieving requested Web page data for the more than one identical Internet request in the NOC;

transmitting the requested Web page data for the more than one identical Internet request to the satellite from the NOC;

relaying the requested Web page data for the more than one identical Internet request to the satellite transceiver through the satellite;

forwarding the requested Web page data for the more than one identical Internet request to the server;

receiving the requested Web page data for the more than one identical Internet request in the server; and fusing received Web page data for a requested Web page into a single low-latency Web page response in accordance with the unique IDs in the server for viewing by the client PC.

10. The method of providing low-latency aircraft satellite Internet service from a commercial off-the-shelf two-way satellite Internet system of claim 9 further comprising the step of viewing the requested Web page with low-latency with the client PC when a failure in transmitting and receiving identical Internet requests and requested Web pages between the satellite transceiver, the satellite, and the NOC occurs.

11. The method of providing low-latency aircraft satellite Internet service from a commercial off-the-shelf two-way satellite Internet system of claim 9 further comprising the step of determining a number of identical Internet requests by communications link quality.

12. The method of providing low-latency aircraft satellite Internet service from a commercial off-the-shelf two-way satellite Internet system of claim 9 further comprising the step of sending more requests to the NOC through the satellite when the server on board the aircraft receives few replies back for requests from the NOC.

13. The method of providing low-latency aircraft satellite Internet service from a commercial off-the-shelf two-way satellite Internet system of claim 9 further comprising the step of dropping back to one request from the server when the server on board the aircraft has most requests acknowledged.

14. A method of providing low-latency satellite Internet service from a commercial off-the-shelf two-way satellite Internet system for vehicles under marginal communications link conditions comprising the steps of:

originating an Internet request at a client PC on board the vehicle;

generating in a server from the client Internet request more than one identical Internet request each having a unique ID;

transmitting the more than one identical Internet request in rapid succession from a satellite transceiver in the vehicle;

receiving one or more surviving identical Internet requests from the vehicle at a satellite;

sending one or more surviving identical Internet requests from the satellite in rapid succession;

receiving one or more surviving identical Internet requests from the satellite in a network operations center (NOC);

forwarding from the NOC the surviving one or more identical Internet requests over the Internet to an appropriate Web site;

retrieving requested Web page data for the one or more surviving identical Internet requests from the Internet in the NOC;

transmitting the requested Web page data for the one or more surviving identical Internet requests to the satellite from the NOC;

relaying surviving requested Web page data for the surviving one or more identical Internet requests to the vehicle with the satellite; and fusing the surviving requested Web page data for the surviving one or more identical Internet requests into a single low-latency Web page response in accordance with the unique IDs in the server for viewing by the client PC.

15. The method of providing low-latency aircraft satellite Internet service from a commercial off-the-shelf two-way satellite Internet system of claim 14 further comprising the step of determining a number of identical Internet requests by communications link quality.

16. The method of providing low-latency aircraft satellite Internet service from a commercial off-the-shelf two-way satellite Internet system of claim 15 further comprising the step of determining an upper limit on the number of identical Internet requests by available system bandwidth.

17. The method of providing low-latency aircraft satellite Internet service from a commercial off-the-shelf two-way satellite Internet system of claim 14 further comprising the step of increasing the number of identical Internet requests when the server on board the vehicle receives insufficient surviving Web page data for the one or more surviving identical Internet requests.

18. The method of providing low-latency aircraft satellite Internet service from a commercial off-the-shelf two-way satellite Internet system of claim 14 further comprising the step of decreasing the number of identical Internet requests when sufficient surviving requested Web page data for the one or more surviving identical Internet requests is received.

19. The method of providing low-latency aircraft satellite Internet service from a commercial off-the-shelf two-way satellite Internet system of claim 14 further comprising the step of determining temporal diversity of the one or more identical Internet requests by communications link quality.

20. The method of providing low-latency aircraft satellite Internet service from a commercial off-the-shelf two-way satellite Internet system of claim 14 further comprising the step of determining temporal diversity of the one or more identical Internet requests by vehicle dynamics.

* * * * *